3,623,912
FUEL CELL WITH FLUID CIRCULATING MEANS
Bernard William Wessling, Winthrop, Mass., assignor
to Brunswick Corporation
Filed Jan. 30, 1969, Ser. No. 795,286
Int. Cl. H01m 27/04
U.S. Cl. 136—86 D          2 Claims

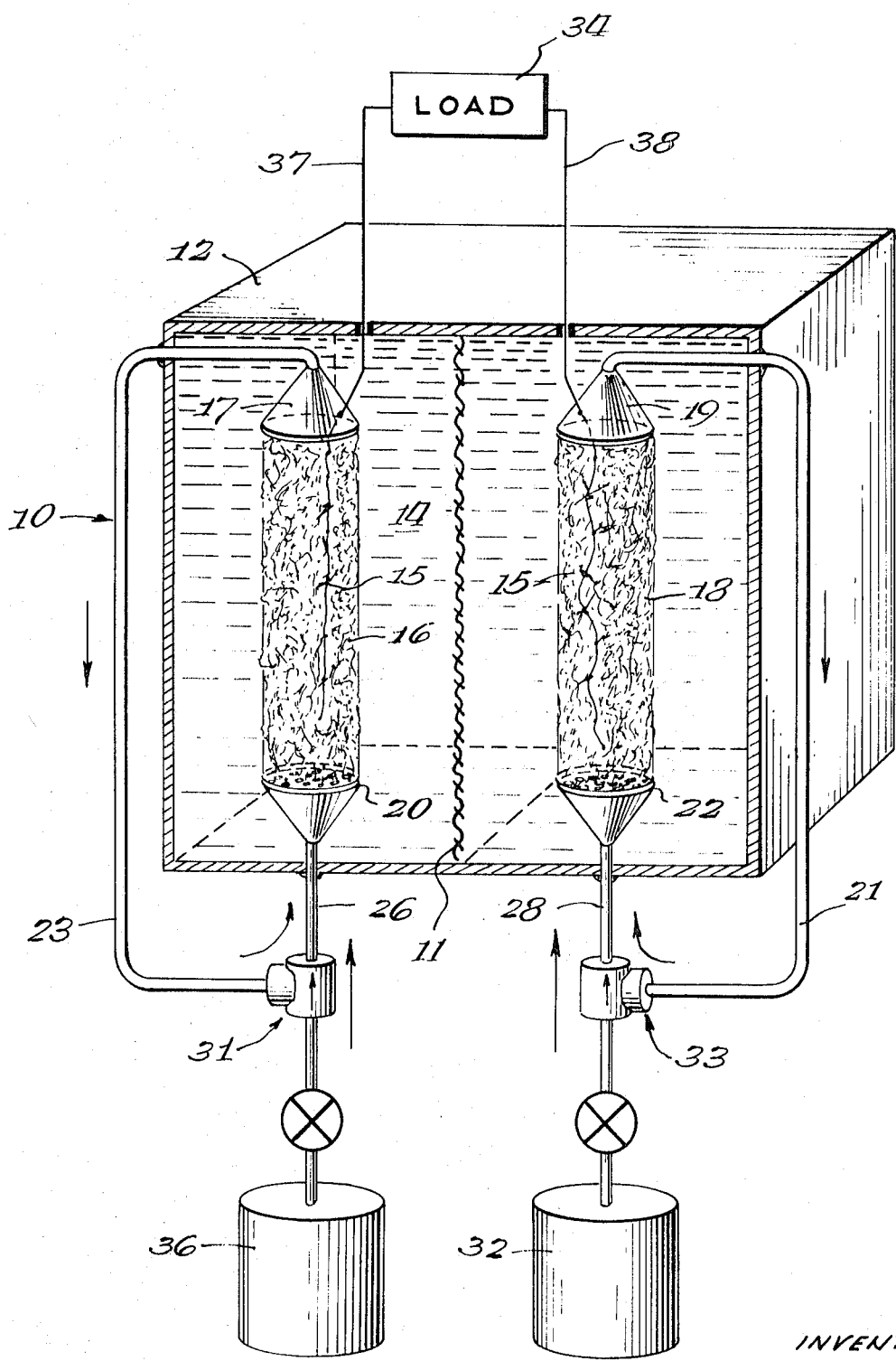

ABSTRACT OF THE DISCLOSURE

This disclosure describes a new fuel cell and a three dimensional fuel cell electrode. The fuel cell comprises an electrolyte and a pair of three dimensional electrodes made of catalyzed micron-size metal filaments fabricated into skeletons. The hydrogen and oxygen gases are bubbled up through their respective electrodes in a direction closely prallel to the electrode's axes. By bubbling the gases through the electrodes in this manner a large number of three phase reaction sites are obtained for a given volume of electrode material. These reaction sites lead to higher energy and power densities while requiring less catalyst material and lower initial cost. This fuel cell utilizes a three dimensional electrode whereas conventional fuel cells are limited to utilizing effectively only a two dimensional electrode surface.

BACKGROUND OF THE INVENTION

Field of the invention

This invention is in the field of fuel cells and, more particularly, is a fuel cell with a new type of electrode.

Description of the prior art

During the seven years commencing in 1961, the operational characteristics of fuel cells have stimulated research aimed at making these energy converters competitively economical with other sources of electrical energy. A major obstacle to commercial utility has been the low energy density and low power density of otherwise promising fuel cells. In the case of low temperature fuel cells this has increased the amount of expensive catalyst needed to transform fuel energy into electrical energy. Similarly, the cost of large high-temperature cells have made them commercially prohibitive.

It was recognized that one method for increasing the energy and power densities of fuel cells was to increase the surface area of the electrodes which serve both as reaction sites and barriers between the fluid fuels and electrolytes. The essential requirements for each electrode are that it provides a reaction site for gas and electrolyte in the vicinity of a catalyst and provides an electron path to the load. Fuel pressures and electrode porosity determine the allowable thickness of the electrode with respect to eliminating electrolyte flooding and/or gas penetration into the electrolyte. Either of these phenomena reduce the efficiency of the fuel cell by decreasing the number of these three phase reaction sites (catalyst-gas-liquid). Research effort was concentrated on lowering costs by reducing the amount of catalyst materials and by developing sintered powder metal electrodes having a high surface area to offset the limitations of the plate thickness imposed by the gas and liquid pressures. These approaches also failed to provide sufficient economies and failed to provide a solution to the problem to which the invention to be described is addressed.

From a performance rather than a cost standpoint of view, perhaps the most successful fuel cells are those known as F. T. Bacon's modified cells or E. W. Justi's fuel cells incorporating two powder metal electrodes, also referred to in the literature as DSK electrodes.

A DSK electrode can be visualized as comprising a pair of metal sheets, one sheet having a large number of holes which are slightly smaller in diameter than the holes of the other sheet. The sheets are visualized as being bonded together to form an electrode with the holes coaxially aligned so that for each orifice in the electrode, the opening facing the liquid electrolyte is smaller than the opening facing the gaseous fuel.

By properly balancing the electrolyte capillary forces with the controlled fuel gas pressure, the three phase reaction (fuel-metal-electrolyte) can be promoted within the orifice. Given these conditions it is clear that irrespective of the thickness of the electrode, the locus of the reaction sites fall within a plane much thinner than that of the electrode. Therefore, an electrode as thin as the locus would provide optimum results in terms of densities if the fuel gas pressure control system were sensitive enough to prevent flooding of the electrode by either the fuel gas or the electrolyte. This cannot be achieved economically. Therefore, the question to be resolved was whether there was any electrode configuration which could provide a fuel cell capable of competitive performance against existing fuel cells and yet which would be economical for commercial utility.

SUMMARY OF THE INVENTION

This invention relates to fuel cells and is concerned with a new and novel device that generates electrical energy.

A principal feature, therefore, of the present invention is the provision of a new and novel fuel cell based on an electrode configuration which comprises at least one three dimensional electrode immersed in an electrolyte wherein the fluid fuel and oxidizer are bubbled through the electrodes.

Another feature of the invention is the provision of an electrode made from a skeleton of fine filaments.

Still another feature of the invention is the provision for recycling unused fluids through the electrodes.

Yet another feature of the invention is the provision that the electrodes are coaxial.

A further feature of the invention is the provision that the fluids used are fuels and oxidizers.

Yet still another feature of the invention is the provision for the electrode, the fluid and the electrolyte being confined in one section of the cell.

The above and other and further objects and features will be more readily understood by reference to the following detailed description and the accompanying drawing which is a pictorial view depicting the fuel cell.

DESCRIPTION OF THE PREFERRED EMBODIMENT

The fuel cell 10 comprises a case 12 containing a liquid electrolyte 14, a pair of electrodes 16 and 18 immersed in the electrolyte 14 and means for transporting gaseous fuel and oxidizer to the electrodes 16 and 18 including gas diffusers 20 and 22 and tubes 26 and 28 connecting the electrodes 16 and 18 to a fuel gas storage tank 36 and an oxidizer gas storage tank 32. The fuel cell is connected to an electrical load 34 by leads 37 and 38 which are electrically bonded to the electrodes 16 and 18. The unused gases are collected by traps 17 and 19 and fed back into the tubes 26 and 28 by pipes 21 and 23. The unused fuel is then recycled respectively through electrodes 16 and 18. When the fuel and oxidizer are exhausted while bubbling through the electrodes no recycling takes place.

The fluid fuel or oxidizer bubbles through the electrode structure defining the electrode's bubbling path. In the preferred embodiment of the invention the path is substantially parallel to the force of buoyancy of the fluid. However, this need not be so. If the electrode structure is contained within the encapsulatory enclosure preventing the escape of the fluid fuel or oxidizer, then the path need not be parallel to the force of buoyancy.

The electrolyte 14 can be a material such as KOH, NaOH or other bases, acids and other liquid electrolytes that are also compatible with other materials in the fuel cell.

The fuel electrode 16 comprises a three dimensional porous material (shown in the shape of a column) which is substantially flooded with electrolyte 14. Preferably the porous material is a skeleton of fine metal filaments such as micron-diameter nickel, stainless steel, platinum or other suitable metals wherein the skeleton presents very low resistance to gas flow therethrough because of the high degree of porosity. By using metal filaments of only a few microns in diameter, skeletons having extremely high surface area to volume ratios can be constructed which have superior fluid flow characteristics to sintered powder materials, although the latter may be used. It has been found that metal filaments in micron-size diameters taught by Webber and Wilson in U.S. Pat. No. 3,379,000 and by Roberts and Roberts in U.S. Pat. No. 3,394,213 are highly suitable.

The preferred material for the filaments is nickel although other metals in filament form will also work. In the preferred embodiment the metal filaments may be sintered into a highly porous skeleton structure 15 although it is only necessary that the filaments are electrically connected. A catalyst can be incorporated into the electrode skeleton structure 15 by a number of methods. For example, platinum catalysis can be achieved by electroplating with platinum black from chloroplatinic acid using any desired method. Raney metal catalyst can also be used by sintering nickel-aluminum alloy particles to the metal skeleton structure 15, followed by dissolution of the aluminum in any suitable solution such as a ten percent (10%) KOH.

The oxidizer electrode 18 is substantially the same as the fuel electrode 16. The basic difference is the choice of catalyst to promote an oxygen reaction rather than a hydrogen reaction. Good oxygen catalysts are materials such as platinum, Raney silver and silver, however other compatible materials may be used.

A barrier 11 divides the cell into two sections wherein electrode 16 is in one section and electrode 18 is in the other section. This barrier 11 prevents the intermixing of gases and may be made from materials such as fiber glass fabric, polymeric fabric or any other material that is porous and inert with respect to the electrolyte 14 that is being used.

The pipes 21 and 23 deliver the unused fluid into pump and valving devices 31 and 33 permitting the recycling of unused fluids. The devices 31 and 33 prevent new fluids from entering the pipes 21 and 23 as well as enabling the unused fluids to be properly channelled into the tubes 26 and 28.

The cell 10 is placed in operation by transporting gases, here hydrogen and oxygen, from storage tanks 36 and 32 to diffusers 20 and 22 located directly underneath the columnar electrodes 16 and 18. The diffusers act in combination with the electrolyte to break the gas streams into gas bubbles which percolate through the columnar electrodes in directions closely parallel to the electrodes' axis. Although many devices can be used as diffusers, the collimated hole structure as taught by Roberts and Roberts in U.S. patent application Ser. No. 778,679 filed Nov. 25, 1968, now Pat. No. 3,506,885, and owned by the assignee hereof are recommended because the holes are uniform in diameter and parallel as well as having a homogenous structure.

In contrast to the teachings of the DSK and other types of thin plate electrodes, the bubbling of fuel gas through three dimensional electrodes provides important beneficial results. For example, the bubbling gas provides constantly renewed reaction sites in the electrode. Unlike the DSK and other similar electrodes, the locus of the three phase reaction sites is not a thin plane having an area equal to that of the electrode but instead is essentially most of the volume of the three dimensional electrode. This can be more readily understood by visualizing the fuel gas propagating from the diffuser in a series of planes each having an area equal to the horizontal cross-section of the electrode. If the spacing between each of the planes was almost zero, then the volume of the reaction sites would be computed by integrating the areas of the planes from the diffusers up to the top of the electrode. The value of this integral would be the volume of the electrode; however, in actual practice the gas does not come off the diffuser in planes and there is finite spacing between active sites. Therefore, while the total reaction volume does not equal the total electrode volume, it is, nevertheless, very much higher than with a DSK electrode of similar volume.

Since the active sites act as though they were electrically and chemically connected in parallel, it is clear that the larger the number of sites for a given volume of electrode, the higher the energy and power densities. It is for this reason that the use of a three dimensional electrode provides these new and important results. The use of fine metal filaments is stressed because they provide a high surface area which in turn provides many more active sites and a high porosity skeleton which provides easy access for the gas.

At times not all the gas is consumed at the three phase reaction sites. Therefore, there is a small volume of unused gas at the top of the electrode. By use of the illustrated traps 17 and 19 or any convenient means the gas may be recycled through the electrodes to increase the fuel consumption efficiency.

As shown, the fluid, the electrolyte and the electrode are in one compartmental section of the cell. However, by a change in geometry, the three dimensional electrodes can be made coaxial with the position of the barrier being altered to accommodate this change in arrangement.

It is contemplated within the scope of this invention that fluid fuels such as reformed hydrogen gas (from natural gas), methanol and other gases or liquids can be substituted for hydrogen. In addition, air, liquid oxygen and other gases or liquid oxidizers may be substituted for oxygen gas. These substitute materials may be used in any combination thereof. When liquid fuels are used which have a higher specific gravity than the electrolyte, these liquid fuels will be bubbled down through the electrodes with the diffusers placed at the top of the electrodes.

The design limitations of the three dimensional electrodes and the fuel cells are very few and accordingly these electrodes and fuel cells are expected to find wide application in many embodiments. These embodiments can be made without departing from the scope of this invention as defined in the following claims.

What is claimed is:
1. A fuel cell comprising:
an electrolyte;

a pair of electrodes immersed in the electrolyte, one of the electrodes having a three dimensional columnar configuration and being made of a porous skeleton of fine filament material substantially flooded with electrolyte; and means for transporting fluids to the electrodes including means for bubbling fluids through the electrode in a direction closely parallel to the electrode's columnar axis and means for recycling unused fluids through the electrodes.

2. The fuel cell of claim 1 wherein the electrode, the electrolyte and the fluid are contained in one section of the cell.

References Cited

UNITED STATES PATENTS

| | | | |
|---|---|---|---|
| 3,152,013 | 10/1964 | Juda | 136—86 |
| 3,215,562 | 11/1965 | Hindin | 136—86 |
| 3,284,243 | 11/1966 | Von Sturm | 136—86 X |
| 3,338,747 | 8/1967 | Plust et al. | 136—86 |
| 3,424,620 | 1/1969 | Hughes et al. | 136—86 |

ALLEN B. CURTIS, Primary Examiner